(12) United States Patent
Cho et al.

(10) Patent No.: US 12,002,987 B2
(45) Date of Patent: Jun. 4, 2024

(54) SEPARATOR FOR RECHARGEABLE LITHIUM BATTERY AND RECHARGEABLE LITHIUM BATTERY COMPRISING SAME

(71) Applicants: Samsung SDI Co., Ltd., Yongin-si (KR); SAMSUNG ELECTRONICS CO., LTD., Suwon-si (KR)

(72) Inventors: Minho Cho, Yongin-si (KR); Hana Kim, Yongin-si (KR); Myungkook Park, Yongin-si (KR); Seung Rim Yang, Seongnam-si (KR); Byungmin Lee, Yongin-si (KR); Jungsue Jang, Yongin-si (KR); Bokyung Jung, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 834 days.

(21) Appl. No.: 17/055,507

(22) PCT Filed: Mar. 27, 2019

(86) PCT No.: PCT/KR2019/003545
§ 371 (c)(1),
(2) Date: Nov. 13, 2020

(87) PCT Pub. No.: WO2019/221381
PCT Pub. Date: Nov. 21, 2019

(65) Prior Publication Data
US 2021/0226298 A1 Jul. 22, 2021

(30) Foreign Application Priority Data
May 18, 2018 (KR) .................. 10-2018-0057196

(51) Int. Cl.
*H01M 50/417* (2021.01)
*H01M 4/62* (2006.01)
(Continued)

(52) U.S. Cl.
CPC ......... *H01M 50/417* (2021.01); *H01M 4/622* (2013.01); *H01M 10/0525* (2013.01);
(Continued)

(58) Field of Classification Search
None
See application file for complete search history.

(56) References Cited

U.S. PATENT DOCUMENTS 7,833,654 B2   11/2010   Ichikawa et al.
9,799,926 B2   10/2017   Choi et al.
(Continued)

FOREIGN PATENT DOCUMENTS

JP   2017-50149 A    3/2017
KR   10-0555848 B1   3/2006
(Continued)

OTHER PUBLICATIONS

International Search Report and Written Opinion for International Application No. PCT/KR2019/003545, dated Jul. 3, 2019, 9pp.

*Primary Examiner* — Jonathan Crepeau
(74) *Attorney, Agent, or Firm* — Lewis Roca Rothgerber Christie LLP

(57) ABSTRACT

The present disclosure provides a separator for a rechargeable lithium battery and a rechargeable lithium battery including same, the separator includes a porous substrate; and an adhesive layer formed on the porous substrate. The adhesive layer includes a particle-type binder having a core-shell structure including a core and a shell surrounding the core, the core includes a first polymer having a glass transition temperature of less than or equal to 30° C., the (Continued)

shell includes a second polymer having a glass transition temperature of greater than or equal to 40° C., and the particle-type binder has a diameter of 50 nm to 500 nm.

13 Claims, 2 Drawing Sheets

(51) Int. Cl.
    *H01M 10/0525* (2010.01)
    *H01M 50/409* (2021.01)
    *H01M 50/42* (2021.01)
    *H01M 50/434* (2021.01)
    *H01M 50/443* (2021.01)
    *H01M 50/446* (2021.01)
    *H01M 50/457* (2021.01)
    *H01M 50/46* (2021.01)
    *H01M 50/489* (2021.01)

(52) U.S. Cl.
    CPC ......... *H01M 50/409* (2021.01); *H01M 50/42* (2021.01); *H01M 50/434* (2021.01); *H01M 50/443* (2021.01); *H01M 50/446* (2021.01); *H01M 50/457* (2021.01); *H01M 50/461* (2021.01); *H01M 50/489* (2021.01)

(56) References Cited

U.S. PATENT DOCUMENTS

| | | |
|---|---|---|
| 2014/0227603 A1 | 8/2014 | Ogata |
| 2015/0072213 A1 | 3/2015 | Kaneda |
| 2015/0200387 A1 | 7/2015 | Nishikawa et al. |
| 2016/0293999 A1 | 10/2016 | Kim et al. |
| 2017/0155107 A1 | 6/2017 | Akiike et al. |

FOREIGN PATENT DOCUMENTS

| | | |
|---|---|---|
| KR | 10-2007-0090852 A | 9/2007 |
| KR | 10-1025187 B1 | 3/2011 |
| KR | 10-2012-0131311 A | 12/2012 |
| KR | 10-2014-0069201 A | 6/2014 |
| KR | 10-2014-0144182 A | 12/2014 |
| KR | 10-1578367 B1 | 12/2015 |
| KR | 10-2017-0022042 A | 3/2017 |
| KR | 10-2017-0039620 A | 4/2017 |
| KR | 10-2018-0003177 A | 1/2018 |
| WO | WO 2004/097971 A1 | 11/2004 |
| WO | WO 2016/103559 A1 | 6/2016 |

[Figure 1]
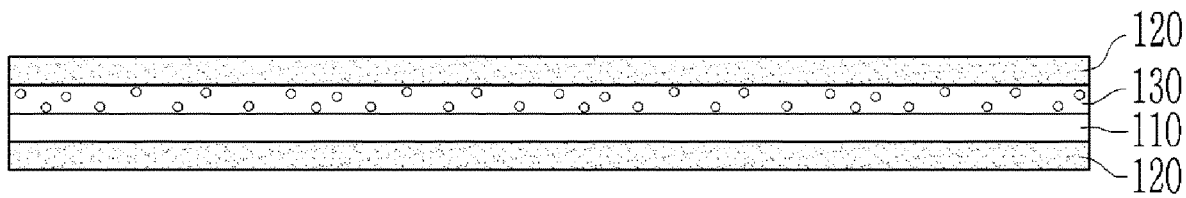
[Figure 2]
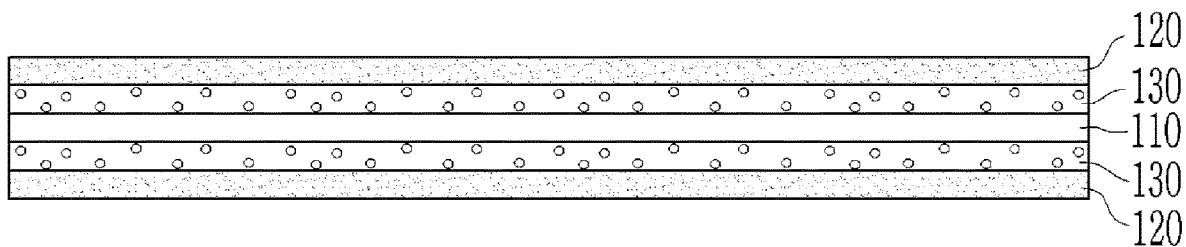

【Figure 3】
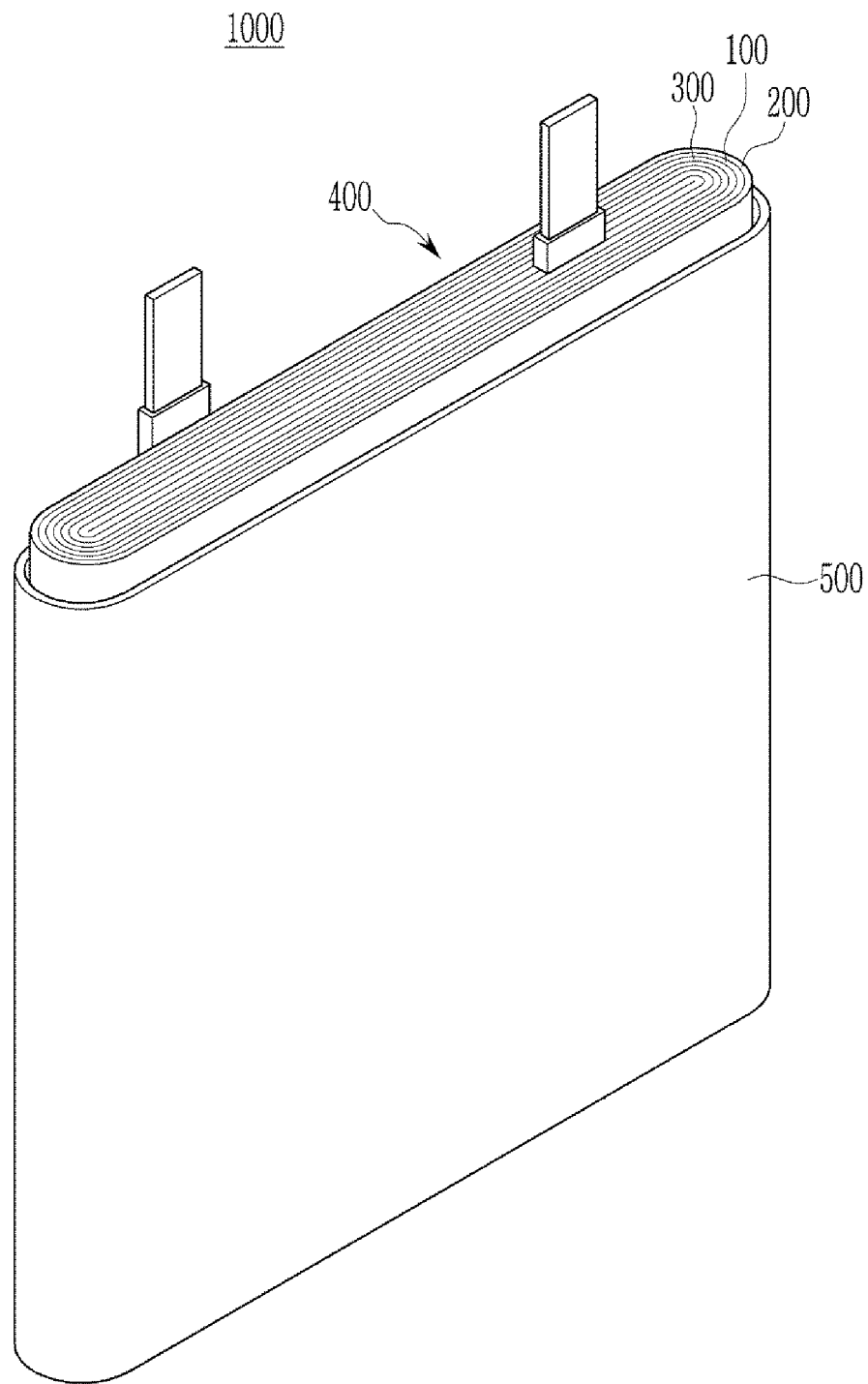

SEPARATOR FOR RECHARGEABLE LITHIUM BATTERY AND RECHARGEABLE LITHIUM BATTERY COMPRISING SAME

CROSS-REFERENCE TO RELATED APPLICATION(S)

This application is a National Phase Patent Application of International Patent Application Number PCT/KR2019/003545, filed on Mar. 27, 2019, which claims priority of Korean Patent Application No. 10-2018-0057196, filed May 18, 2018. The entire contents of both of which are incorporated herein by reference.

TECHNICAL FIELD

A separator for a rechargeable lithium battery, and a rechargeable lithium battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability is required.

In connection with this, a method of increasing thermal resistance of the separator by coating the separator with a mixture of inorganic particles having a large thermal resistance and an organic binder having adhesion is well known. However, this conventional method may not sufficiently secure desired adhesion and not uniformly applied to variously-sized separators. Accordingly, a separator having high heat resistance and excellent adhesion needs to be developed.

DISCLOSURE

Technical Problem

The present invention is to provide a binder composition for a rechargeable lithium battery capable of effectively controlling expansion of an active material, keeping a lithium ion path and thus improving battery capacity, and reducing a side reaction and thus having excellent stability with an electrolyte and a rechargeable lithium battery including the binder composition and having excellent initial efficiency, charge and discharge characteristics, cycle-life characteristics, and the like.

Technical Solution

A separator for a rechargeable lithium battery according to an embodiment includes a porous substrate and an adhesive layer formed on the porous substrate, wherein the adhesive layer includes a particle-type binder having a core-shell structure including a core and a shell surrounding the core, the core includes a first polymer having a glass transition temperature of less than or equal to 30° C., the shell includes a second polymer having a glass transition temperature of greater than or equal to 40° C., and the particle-type binder has a diameter of 50 nm to 500 nm.

A rechargeable lithium battery according to another embodiment includes a positive electrode, a negative electrode, and a separator for a rechargeable lithium battery between the positive electrode and the negative electrode.

Advantageous Effects

A separator for a rechargeable lithium battery having excellent electrode adhesion and air permeability, and a rechargeable lithium battery including the same may be provided.

DESCRIPTION OF THE DRAWINGS

FIG. 1 is a view schematically illustrating a separator for a rechargeable lithium battery according to an embodiment.

FIG. 2 is a view schematically illustrating a separator for a rechargeable lithium battery according to an exemplary variation of FIG. 1.

FIG. 3 is a view schematically illustrating a structure of a rechargeable lithium battery according to an embodiment.

DESCRIPTION OF SYMBOLS

1000: rechargeable lithium battery
100: separator
110: porous substrate
120: adhesive layer
130: heat-resistant layer
200: positive electrode
300: negative electrode
400: electrode assembly
500: case

BEST MODE

Hereinafter, the exemplary embodiments of the present invention will be described in detail, referring to the accompanying drawings. However, in the description of the present disclosure, descriptions for already known functions or components will be omitted for clarifying the gist of the present disclosure.

In order to clearly describe the present disclosure, parts which are not related to the description are omitted, and the same reference numeral refers to the same or like components, throughout the specification. In addition, since the size and the thickness of each component shown in the drawing are optionally represented for convenience of the description, the present disclosure is not limited to the illustration.

In the drawings, the thickness of layers, films, panels, regions, etc., are exaggerated for clarity. In the drawings, the thickness of a part of layers or regions, etc., is exaggerated for clarity. It will be understood that when an element such as a layer, film, region, or substrate is referred to as being "on" another element, it can be directly on the other element or intervening elements may also be present.

In the present specification, (meth)acryl refers to both acryl and methacryl.

Separator for Rechargeable Lithium Battery

FIG. 1 is a view schematically illustrating a separator for a rechargeable lithium battery according to an embodiment, and FIG. 2 is a view schematically illustrating a separator for a rechargeable lithium battery according to an exemplary variation of FIG. 1.

Referring to FIGS. 1 and 2, a separator for a rechargeable lithium battery according to an embodiment of the present invention includes a porous substrate 110 and an adhesive layer 120.

The porous substrate 110 may have a plurality of pore and may generally be a porous substrate used in an electrochemical device. Non-limiting examples of the porous substrate 110 may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate 110 may be for example a polyolefin-based substrate, and the polyolefin-based substrate may improve has safety of a battery due to its improved shut-down function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 110 may have a thickness of about 1 μm to 40 μm, for example 1 μm to 30 μm, 1 μm to 20 μm, 5 μm to 15 μm, or 10 μm to 15 μm.

The adhesive layer 120 includes a particle-type binder having a core-shell structure including a core and a shell surrounding the core. Herein, the core includes a first polymer having a glass transition temperature of less than or equal to 30° C. and the shell includes a second polymer having a glass transition temperature of greater than or equal to 40° C. The glass transition temperature may be a value measured by differential scanning calorimetry.

In an embodiment, the glass transition temperature of the shell may be greater than or equal to 40° C. and less than or equal to 80° C. When the glass transition temperature of the shell is within the above range, since the adhering process may be performed at an appropriate temperature, it is possible to secure electrode adhesion and be advantageous in terms of process efficiency.

In addition, since the glass transition temperature of the shell is higher, the particle-type binder may be prevented from being clumped or filmed during the separator coating process. Accordingly, even if a temperature is increased due to the operation of the rechargeable lithium battery, the particle-type binder may keep the particle shape and thus secure air permeability as well as maintain adhesion. The higher air permeability a separator has, the more ion paths are secured during the operation of the rechargeable lithium battery, and accordingly, according to the embodiment of the present invention, even if a temperature is increased due to the operation of the rechargeable lithium battery, since the ion paths are not blocked, a separator for a rechargeable lithium battery capable of maintaining performance may be provided.

The glass transition temperature of the core and the glass transition temperature of the shell may have a difference of at least greater than or equal to 20° C., for example greater than or equal to 30° C. As the glass transition temperatures of the core and the shell have a larger difference, a separator more advantageously securing air permeability as well as maintaining adhesion may be provided.

In an embodiment, the particle-type binder having the core-shell structure may include a core and a shell in a weight ratio of 1:9 to 3:7 based on a total weight of the particle-type binder.

The particle-type binder may include a polyacrylic binder or a polyolefin binder. For example, a polyacrylic binder that is more advantageous for forming a core-shell structure may be included because it can be prepared by an emulsion polymerization method.

The first polymer and the second polymer may include the same or different binders among polyacrylic binders and polyolefin-based binders, and may further include a binder for imparting additional functions.

The particle-type binder may include one or more (meth)acrylate structural unit represented by Chemical Formula 1.

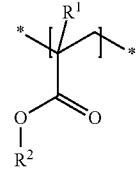

[Chemical Formula 1]

In Chemical Formula 1, $R^1$ is hydrogen or a C1 to C5 alkyl group, $R^2$ is a C1 to C10 alkyl group, and

* is a linking point.

Herein, the particle-type binder may include two or more types of the (meth)acrylate structural units that are represented by Chemical Formula 1 and different from each other. Herein, "different from each other" means that $R^1$ and $R^2$ included in a plurality of structural units represented by Chemical Formula 1 are different from each other. The glass transition temperature may be adjusted according to the contents of two or more different (meth)acrylate structural units. Therefore, even if the first polymer and the second polymer include the same structural units, they may have different glass transition temperatures depending on the content of each structural unit.

Specifically, as the content of the (meth)acrylate structural unit in the polymer increases, the glass transition temperature becomes lower. For example, in the case of the first polymer, when 40 wt % to 100 wt % of the (meth)acrylate structural unit is added based on a total mass of the first polymer, it may have a glass transition temperature of less than or equal to 30° C. In addition, in the case of the second polymer, when 0 wt % to 77 wt % of the (meth)acrylate structural unit is added based on a total mass of the second polymer, it may have a glass transition temperature of greater than or equal to 40° C.

Meanwhile, the particle-type binder may further include at least one of a phenyl group-containing structural unit represented by Chemical Formula 2 and a cyano group-containing structural unit represented by Chemical Formula 3, and an ester group-containing structural unit represented by Chemical Formula 4.

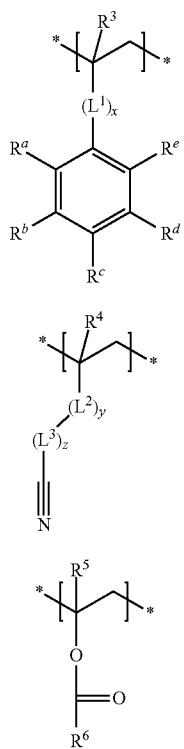

[Chemical Formula 2]

[Chemical Formula 3]

[Chemical Formula 4]

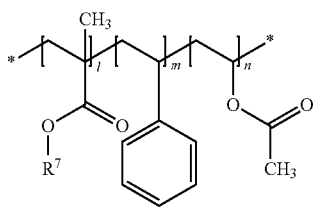

[Chemical Formula 5]

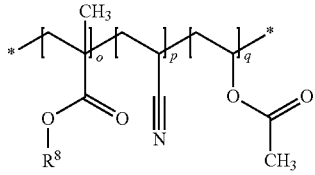

[Chemical Formula 6]

In Chemical Formula 2 to Chemical Formula 4, $R^3$ to $R^5$ are independently hydrogen or a C1 to C5 alkyl group, $R^6$ is a C1 to C10 alkyl group, $R^a$ to $R^e$ are independently hydrogen or a C1 to C5 alkyl group, $L^1$ to $L^3$ are independently a C1 to C5 alkyl group, x, y, and z are independently an integer of 0 to 2, and

* is a linking point.

The glass transition temperature may increase as the polymer includes a relatively large amount of the phenyl group-containing structural unit represented by Chemical Formula 2 or the cyano group-containing structural unit represented by Chemical Formula 3. For example, in the first polymer, the phenyl group-containing structural unit represented by Chemical Formula 2 or the cyano group-containing structural unit represented by Chemical Formula 3 may be included in an amount of less than or equal to 0.2 mole, for example 0 mole to 0.1 mole based on 1 mole of the (meth)acrylate structural unit represented by Chemical Formula 1, the glass transition temperature may be less than or equal to 30° C. Meanwhile, in the second polymer, the phenyl group-containing structural unit represented by Chemical Formula 2 or the cyano group-containing structural unit represented by Chemical Formula 3 may be included in an amount of greater than or equal to 0.5 mole, for example 0.5 mole to 5.0 mole, or 0.7 mole to 5.0 mole based on 1 mole of the (meth)acrylate structural unit represented by Chemical Formula 1, the glass transition temperature may be greater than or equal to 40° C.

In addition, the first polymer may include greater than or equal to 0.5 mole of the ester group-containing structural unit represented by Chemical Formula 4 based on 1 mole of the (meth)acrylate structural unit represented by Chemical Formula 1, for example, 0.5 moles to 0.8 moles, or 0.6 moles to 0.8 moles, and the second polymer may include greater than or equal to 0.5 mole of the ester group-containing structural unit represented by Chemical Formula 4 based on 1 mole of the (meth)acrylate structural unit represented by Chemical Formula 1, for example, 0.5 moles to 1.2 moles or 0.7 moles to 1.2 moles.

At least one of the first polymer and the second polymer may include a structural unit represented by Chemical Formula 5 or Chemical Formula 6.

In Chemical Formula 5 and In Chemical Formula 6, $R^7$ and $R^8$ are independently a C1 to C5 alkyl group, l and o of the first polymer are each independently 50 mol % to 60 mol %, m and p are each independently 0 mol % to 10 mol %, and n and q are each independently 30 mol % to 50 mol %, l and o of the second polymer are each independently 10 mol % to 30 mol %, m and p are each independently 50 mol % to 70 mol %, and n and q are each independently 10 mol % to 30 mol %, and

* is a linking point.

Herein, the first polymer and the second polymer may include structural units represented by the same chemical formula and may have different mole ratios. The different mole ratio of the first and second polymers means that the first and second polymers includes a structural unit represented by the same Chemical Formula, but l, m, and n of the first and second polymers or o, p, and q of the first and second polymers are different each other. In other words, a different mole ratio of the l:m:n or the o:p:q may be different each other. The glass transition temperature may be changed depending on a mole ratio of each structural unit. Accordingly, the first and second polymers include the same structural unit, and thus both of them may include a structural unit represented by the same chemical formula like Chemical Formula 5 or 6. Herein, since each structural unit included in the first and second polymers has a different mole ratio, the first and second polymers may have a different glass transition temperature.

For example, m or p of the second polymer having a relatively high glass transition temperature may be larger than that of first polymer having a relatively low glass transition temperature. In other words, in order to produce a binder having a lower glass transition temperature, the (meth)acrylate-based structural unit represented by Chemical Formula 1 and the ester group-containing structural unit represented by Chemical Formula 4 are included in higher contents, but in order to produce a binder having a higher glass transition temperature, the mole ratio of the phenyl group-containing structural unit represented by Chemical Formula 2 or the cyano group-containing structural unit represented by Chemical Formula 3 may be increased.

The diameter of the particle-type binder may be 50 nm to 500 nm. For example, it may be 100 nm to 400 nm, for example 150 nm to 300 nm, or 150 nm to 250 nm. The diameter may be an average particle diameter of the particle-type binder and may be particle size ($D_{50}$) at a volume ratio of 50% in a cumulative size-distribution curve. When the particle-type binder has the above diameter, it is easier to control the thickness of the coating layer when forming the adhesive layer 120 on the separator 100 by a coating method.

Further, the adhesive layer 120 may have a thickness of about 0.01 µm to 5 µm, for example, 0.3 µm to 1.5 µm. When the thickness of the adhesive layer 120 falls within the above range, air permeability may be maintained and thus high adhesion to the electrode may be secured without deteriorating the performance of the lithium ion battery.

The adhesive layer 120 may further include an adhesive binder in addition to the particle-type binder. The adhesive binder may be a polyvinyl alcohol-based binder. When the adhesive layer 120 further includes an adhesive binder, adhesion between the separator 100 and the electrode may be further improved.

The particle-type binder may have a weight average molecular weight of 100,000 g/mol to 1,000,000 g/mol, for example 200,000 g/mol to 900,000 g/mol, for example, 300,000 g/mol to 800,000 g/mol, for example, 400,000 g/mol to 800,000 g/mol. When the weight average molecular weight of the particle-type binder satisfies the above range, the particle-type binder and the separator including the particle-type binder may exhibit excellent adhesion, heat resistance, air permeability, and oxidation resistance. The weight average molecular weight may be polystyrene-reduced average molecular weight measured by gel permeation chromatography.

Meanwhile, the separator for a rechargeable lithium battery according to an embodiment may further include a heat-resistant layer 130 between the porous substrate 110 and the adhesive layer 120. The heat-resistant layer 130 may include a filler. The filler may be an inorganic filler, an organic filler, an organic-inorganic composite filler, or a combination thereof.

The inorganic filler may be a ceramic material capable of improving heat resistance, for example a metal oxide, a semi-metal oxide, a metal fluoride, a metal hydroxide, or a combination thereof. The inorganic filler may be for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto.

The organic filler may include an acrylic compound, an imide compound, an amide compound, or a combination thereof, but is not limited thereto. The organic filler may have a core-shell structure, but is not limited thereto.

The filler may have a spherical shape, sheet-shape, cubic-shape, or amorphous shape. An average particle diameter of the filler may range about 1 nm to 2500 nm, within the range 100 nm to 2000 nm, or 200 nm to 1000 nm, for example about 300 nm to 800 nm. The average particle diameter of the filler may be particle size ($D_{50}$) at a volume ratio of 50% in a cumulative size-distribution curve. By using the filler having an average particle diameter within the ranges, the heat-resistant layer 130 may have an appropriate strength, and the separator 100 may have improved heat resistance, durability, and stability. The filler may be used by mixing two or more different types of fillers or two or more fillers having different sizes.

The filler may be included in amount of 50 wt % to 99 wt %, for example 70 wt % to 99 wt %, for example 75 wt % to 99 wt %, for example 80 wt % to 99 wt %, for example 85 wt % to 99 wt %, for example 90 wt % to 99 wt %, for example 95 wt % to 99 wt % based on a total amount of the heat-resistant layer 130. When the filler is included within the ranges, the separator 100 for a rechargeable lithium battery according to an embodiment may exhibit excellent heat resistance, durability, oxidation resistance, and stability.

The heat-resistant layer 130 may further include a heat-resistant binder. The heat-resistant binder is present between the filler particles to fix the filler particles, so that the organic fillers or inorganic fillers are not detached from the porous substrate 110 and are maintained, and may further provide heat resistance to the heat-resistant layer 130. For example, the heat-resistant binder may be an acrylic heat-resistant binder, but is not limited thereto, and any binder that is commonly used as a binder capable of securing heat resistance may be used.

In addition, the heat-resistant layer 130 may further include a cross-linkable binder or a non-cross-linkable binder in addition to the heat-resistant binder. These may enhance adhering force to the substrate or additionally impart functionality such as heat resistance to the separator.

The cross-linkable binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The cross-linkable binder may be obtained from a monomer, an oligomer and/or a polymer including at least two (meth)acrylate groups, for example ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

For example, the cross-linkable binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the cross-linkable binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyl-diphenyl-4,4'-diisocyanate, xylene diisocyanate, naphthalene diisocyanate, 1,4-cyclohexyl diisocyanate, or a combination thereof.

The non-cross-linkable binder may be for example a vinylidene fluoride-based polymer, polymethylmethacrylate, polyacrylonitrile, polyvinylpyrrolidone, polyvinylacetate, polyvinyl alcohol, polyethylene-vinylacetate copolymer, polyethyleneoxide, cellulose acetate, cellulose acetate butyrate, cellulose acetate propionate, cyanoethyl pullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived structural unit or a copolymer of a vinylidene fluoride-derived structural unit and other monomer-derived structural units. The copolymer may specifically include a vinylidene fluoride-derived structural unit and at least one of structural units derived from chlorotrifluoroethylene, trifluoroethylene, hexafluoropropylene, ethylene tetrafluoride and ethylene monomer, but is not limited thereto. For example, the copolymer may be a polyvinylidene fluoride-hexafluoropropylene (PVdF-HFP) copolymer including a vinylidene fluoride monomer-derived structural unit and a hexafluoropropylene monomer-derived structural unit.

For example, the non-cross-linkable binder may be a polyvinylidene fluoride (PVdF) homopolymer, a polyvinylidene fluoride-hexafluoropropylene (PVdF-HFP) copolymer, or a combination thereof. In this case, adhesion between the porous substrate 110 and the heat-resistant layer 130 is increased, stability of the separator and impregnation properties of an electrolyte are improved, and thus high-rate charge and discharge characteristics of a battery are improved.

The heat-resistant layer 130 may have a thickness of about 1 μm to 10 μm, or about 1 μm to 6 μm, or about 1 μm to 3 μm.

The separator 100 for a rechargeable lithium battery according to an embodiment may exhibit improved air permeability. For example, it may have air permeability of less than or equal to 300 sec/(100 cc 15 μm), for example, less than or equal to 285 sec/(100 cc 15 μm) or less, or less than or equal to 270 sec/(100 cc 15 μm) or less, for example, less than or equal to 265 sec/(100 cc 15 μm). Herein, the air permeability refers to a time (seconds) until 100 cc of air passes through the separator 100. The air permeability per unit thickness may be obtained by measuring air permeability with a respect to the entire thickness of the separator 100 and then, dividing the air permeability by the thickness.

The separator 100 for a rechargeable lithium battery according to an embodiment may be manufactured by known various methods. For example, the separator 100 for a rechargeable lithium battery may be manufactured by coating and drying the composition for an adhesive layer on one surface or both surfaces of the porous substrate 110 to form the adhesive layer 120.

On the other hand, before coating the composition for an adhesive layer, the composition for a heat-resistant may be coated and dried to form the heat-resistant layer 130, and then, on one surface of the heat-resistant layer 130, the composition for an adhesive layer may be coated to form the adhesive layer 120. In addition, the composition for a heat-resistant layer and the composition for an adhesive layer may be simultaneously coated to form the heat-resistant layer and the adhesive layer.

The composition for an adhesive layer may include the aforementioned particle-type binder and a solvent, and the composition for a heat-resistant layer may include the aforementioned heat-resistant binder, a filler, and a solvent. The solvent is not particularly limited if the solvent may dissolve or disperse the binder and the filler. In an embodiment, the solvent may be an aqueous solvent including water, an alcohol, or a combination thereof, which is environmentally-friendly.

The coating may be, for example a spin coating, a dip coating, a bar coating, a die coating, a slit coating, a roll coating, an inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of 25° C. to 120° C.

The separator for a rechargeable lithium battery may be manufactured by lamination, coextrusion, and the like in addition to the above methods.

Rechargeable Lithium Battery

Hereinafter, a rechargeable lithium battery 1000 including the aforementioned separator 100 for a rechargeable lithium battery is described. FIG. 3 is a view schematically illustrating a structure of a rechargeable lithium battery 1000 according to an embodiment.

The rechargeable lithium battery 1000 is a battery that can be reused by charging, and the rechargeable lithium battery 1000 can be classified into a lithium ion battery, a lithium ion polymer battery, and a lithium polymer battery, depending on the type of the separator 100 and electrolyte. According to the shape, it can be classified into a cylindrical type, a square type, a coin type, a pouch type, etc., and may be divided into a bulk type and a thin film type according to the size. Structures and manufacturing methods for lithium ion batteries pertaining to this disclosure are well known in the art.

Herein, as an example of a rechargeable lithium battery 1000, a prismatic rechargeable lithium battery is for example described. FIG. 3 is a view schematically illustrating a structure of a rechargeable lithium battery 1000 according to an embodiment. Referring to FIG. 3, the rechargeable lithium battery 1000 according to an embodiment includes an electrode assembly 400 that is wound by disposing a separator 100 between a positive electrode 200 and a negative electrode 300, and a case 500 housing the electrode assembly 400.

The electrode assembly may be, for example, in the form of a jelly roll formed by winding the positive electrode 200 and negative electrode 300 with the separator 100 disposed therebetween.

The positive electrode 200, the negative electrode 300, and the separator 100 are impregnated in an electrolyte (not shown).

The positive electrode 200 may include a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 300 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 300 may be the same as the binder and conductive material of the positive electrode 200.

The positive electrode 200 and the negative electrode 300 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent.

The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like.

The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like.

The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery 1000, and improves lithium ion transportation between the positive electrode 200 and the negative electrode 300. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x'+1}SO_2)(C_yF_{2y'+1}SO_2)$ (x' and y' are natural numbers), LiCl, LiI, $LiB(C_2O_4)_2$, or a combination thereof, but is not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

MODE FOR INVENTION

Hereinafter, the above aspects of the present disclosure are illustrated in more detail with reference to examples. However, these examples are exemplary, and the present disclosure is not limited thereto.

Synthesis Example 1: Preparation of Particle-Type Binder Having Core-Shell Structure 2,392.2 g of pure (deionized (DI)) water and 0.6 g of SR-10 (ADEKA, a 100% aqueous solution, an emulsifier for a reactive emulsion polymerization or a monomer for a radical polymerization) were put in a mechanical stirring equipment under a nitrogen flow and then, stirred for 15 minutes to prepare a first solution.

128.0 g of butyl methacrylate (BMA, Samchun Chemicals Co., Ltd., 99%), 9.6 g of acrylonitrile (An, Sigma-Aldrich Co., Ltd., 99%) and 62.0 g of vinyl acetate (VAc, Samchun Chemicals Co., Ltd., 99.5%) were injected into the first solution to prepare a second solution.

The second solution was heated up to 60° C., and 299.3 g of pure water and 2.5 g of ammonium persulfate (APS, Samchun Chemicals Co., Ltd., 98%) were added thereto and then, heated up to 75° C. and stirred for 30 minutes to prepare a third solution.

While the third solution was maintained at 75° C., 326.0 g of pure water, a mixed solution of 2.7 g of SR-10, 2.8 g of ammonium persulfate (APS Samchun Chemicals Co., Ltd., 98%), 238.5 g of butyl methacrylate (BMA, Samchun Chemicals Co., Ltd.), 415.0 g of acrylonitrile (AN, Sigma-Aldrich Co., Ltd., 99%), and 144.4 g of vinyl acetate (VAc, Samchun Chemicals Co., Ltd., 99.5%) was slowly injected into the third solution for 240 minutes to prepare acrylic polymer emulsion including a core represented by Chemical Formula 6-1 and a shell represented by Chemical Formula 6-2 in a weight ratio of 2:8 between the core and the shell, having an average diameter of 220 nm, and including 25 wt % of solids.

Each glass transition temperature (Tg) of the core and the shell was measured in the following method.

Measurement of Glass Transition Temperature (Tg)

After drying a measurement sample and weighing 10 mg thereof with an aluminum pan, a differential thermal analysis measuring device and the empty aluminum pan as a reference were used to obtain a DSC curve under room temperature and humidity at a temperature-increasing rate of 10° C./min with the range of −100° C. to 500° C. In this temperature-increasing process, an intersection of a base line just before an endothermic peak of the DSC curve where a differential signal (DDSC) became greater than or equal to 0.05 mW/min/mg with a tangent line of the DSC curve at the first inflection point after the endothermic peak was obtained as a glass transition temperature (Tg).

[Chemical Formula 6-1]

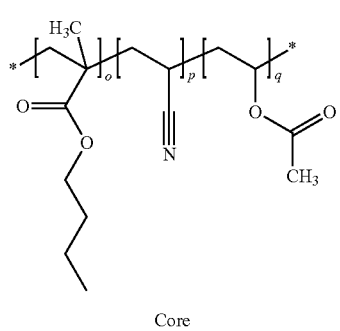

Core

Herein, o:p:q=5:1:4, and Tg is 25° C.

[Chemical Formula 6-2]

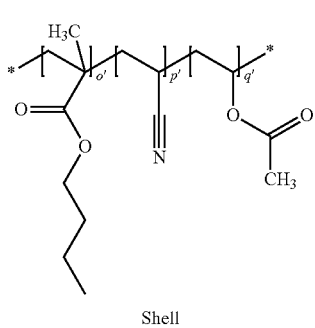

Shell

Herein, o':p':q'=1.5:7:1.5, and Tg is 75° C.

Comparative Synthesis Example 1: Particle-Type Binder Having No Core-Shell Structure (Tg is Less than or Equal to 30° C.)

2,394.6 g of pure (deionized (DI)) water and 0.6 g of SR-10 (ADEKA, 100%, an emulsifier for a reactive emulsion polymerization or a monomer for a radical polymerization) were put in a mechanical stirring equipment under a nitrogen flow and then, stirred for 15 minutes to prepare a first solution.

128.0 g of butyl methacrylate (BMA, Samchun Chemicals Co., Ltd., 99%), 9.6 g of acrylonitrile (AN, Sigma-Aldrich Co., Ltd., 99%), and 62.0 g of vinyl acetate (VAc, Samchun Chemicals Co., Ltd., 99.5%) were injected into the first solution to prepare a second solution.

The second solution was heated up to 60° C., and then, 299.3 g of pure water and 2.5 g of ammonium persulfate (APS, Samchun Chemicals Co., Ltd., 98%) were added thereto and then, heated up to 75° C. and stirred to prepare a third solution.

While the third solution was maintained at 75° C., a mixed solution of 299.3 g of pure (deionized (DI)) water, 2.7 g of SR-10 (ADEKA, 100%, an emulsifier for a reactive emulsion polymerization or a monomer for a radical polymerization), 2.5 g of ammonium persulfate (APS, Samchun Chemicals Co., Ltd., 98%), 512.0 g of butyl methacrylate (BMA, Samchun Chemicals Co., Ltd., 99%), 38.2 g of acrylonitrile (AN, Sigma-Aldrich Co., Ltd., 99%), and 248.0 g of vinyl acetate (VAc, SAMCHUN, 99.5%) was slowly injected thereinto for 240 minutes and then, stirred to prepare an acrylic polymer emulsion including a structural unit represented by Chemical Formula 6-1, having an average diameter of 227 nm, and including solids of 25 wt %.

[Chemical Formula 6-1]

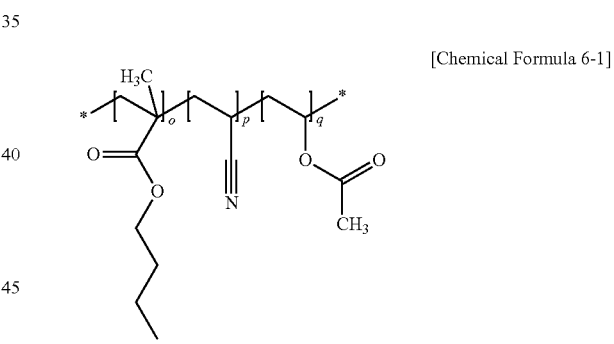

Herein, o:p:q=5:1:4, and Tg is 25° C.

Comparative Synthesis Example 2: Particle-Type Binder Having No Core-Shell Structure (Tg is Greater than or Equal to 40° C.)

2,409.7 g of pure (deionized (DI)) water and 0.6 g of SR-10 (ADEKA, 100%, an emulsifier for a reactive emulsion polymerization or a monomer for a radical polymerization) were put in a mechanical stirring equipment under a nitrogen flow and then, stirred for 15 minutes to prepare a first solution.

60.0 g of butyl methacrylate (BMA, Samchun Chemicals Co., Ltd., 99%), 104.5 g of acrylonitrile (AN, Sigma-Aldrich Co., Ltd., 99%), and 36.3 g of vinyl acetate (VAc, Samchun Chemicals Co., Ltd., 99.5%) were injected into the first solution to prepare a second solution.

After heating the second solution at 60° C., 301.2 g of pure water and 2.5 g of ammonium persulfate (APS, Samchun Chemicals Co., Ltd., 98%) were added thereto and then, heated up to 75° C. for 30 minutes to prepare a third solution.

While the third solution was maintained at 75° C., a mixed solution of 301.2 g of pure (deionized (DI)) water, 2.7 g of SR-10 (ADEKA, 100%, an emulsifier for a reactive emulsion polymerization or a monomer for a radical polymerization), 2.5 g of ammonium persulfate (ammonium persulfate, APS, Samchun Chemicals Co., Ltd., 98%), 240.0 g of butyl methacrylate (BMA, Samchun Chemicals Co., Ltd., 99%), 417.9 g of acrylonitrile (AN, Sigma-Aldrich Co., Ltd., 99%), and 145.3 g of vinyl acetate (VAc, Samchun Chemicals Co., Ltd., 99.5%) was slowly injected into the third solution for 240 minutes to prepare an acrylic polymer emulsion including a structural unit represented by Chemical Formula 6-1, having an average diameter of 217 nm, and including solids of 25 wt %.

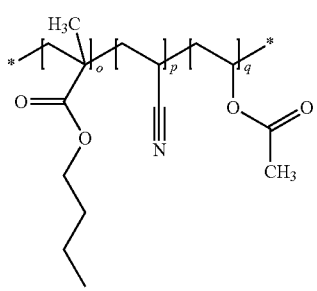

[Chemical Formula 6-1]

Herein, $o:p:q=1.5:7:1.5$, and Tg is 75° C.

Comparative Synthesis Example 3: Particle-Type Binder with Core-Shell Structure (Tg of Core is Greater than or Equal to 40° C. and Tg of Shell is Less than or Equal to 30° C.)

2,409.7 g of pure (deionized (DI)) water and 0.6 g of SR-10 (ADEKA, 100%, an emulsifier for a reactive emulsion polymerization or a monomer for a radical polymerization) were put in a mechanical stirring equipment under a nitrogen flow and then, stirred for 15 minutes to prepare a first solution.

60.0 g of butyl methacrylate (BMA, Samchun Chemicals Co., Ltd., 99%), 104.5 g of acrylonitrile (AN, Sigma-Aldrich Co., Ltd., 99%), and 36.3 g of vinyl acetate (VAc, Samchun Chemicals Co., Ltd., 99.5%) were injected into the first solution to prepare a second solution.

After heating the second solution at 60° C., 301.2 g of pure water and 2.5 g of ammonium persulfate (APS, Samchun Chemicals Co., Ltd., 98%) were added thereto and then, heated up to 75° C. for 30 minutes to prepare a third solution.

While the third solution was maintained at 75° C., a mixed solution of 301.2 g of pure (deionized (DI)) water, 2.7 g of SR-10 (ADEKA, 100%, an emulsifier for a reactive emulsion polymerization or a monomer for a radical polymerization), 2.5 g of ammonium persulfate (APS, Samchun Chemicals Co., Ltd., 98%), 515.2 g of butyl methacrylate (BMA, Samchun Chemicals Co., Ltd., 99%), 38.4 g of acrylonitrile (AN, Sigma-Aldrich Co., Ltd., 99%), and 249.5 g of vinyl acetate (VAc, Samchun Chemicals Co., Ltd., 99.5%) was slowly injected into the third solution for 240 minutes to prepare an acrylic polymer emulsion having a core represented by Chemical Formula 6-1 and a shell represented by Chemical Formula 6-2 in a weight ratio of 2:8 between the core and the shell and an average diameter of 211 nm and including solids of 25 wt %.

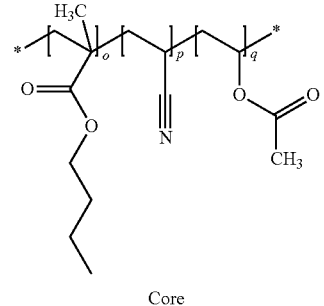

[Chemical Formula 6-1]

Core

Herein, $o:p:q=1.5:7:1.5$, and Tg is 75° C.

[Chemical Formula 6-2]

Shell

Herein, $o':p':q'=5:1:4$, and Tg is 25° C.

Comparative Synthesis Example 4: Particle-Type Binder with Core-Shell Structure (Tg of Core is Greater than or Equal to 30° C. and Tg of Shell is Greater than or Equal to 80° C.)

2,405.3 g of pure (deionized (DI)) water and 0.6 g of SR-10 (ADEKA, 100%, an emulsifier for a reactive emulsion polymerization or a monomer for a radical polymerization) were put in a mechanical stirring equipment under a nitrogen flow and then, stirred for 15 minutes to prepare a first solution.

60.0 g of butyl methacrylate (BMA, Samchun Chemicals Co., Ltd., 99%), 115.6 g of acrylonitrile (AN, Sigma-Aldrich Co., Ltd., 99%), and 32.4 g of vinyl acetate (VAc, Samchun Chemicals Co., Ltd., 99.5%) were injected into the first solution to prepare a second solution.

After heating the second solution at 60° C., 300.7 g of pure water and 2.5 g of ammonium persulfate (APS, Samchun Chemicals Co., Ltd., 98%) were added thereto and then, heated up to 75° C. for 30 minutes to prepare a third solution.

While the third solution was maintained at 75° C., a mixed solution of 300.7 g of pure (deionized (DI)) water, 2.7 g of SR-10 (ADEKA, 100%, an emulsifier for a reactive emulsion polymerization or a monomer for a radical polymerization), 2.5 g of ammonium persulfate (APS, Samchun Chemicals Co., Ltd., 98%), 386.8 g of butyl methacrylate (BMA, Samchun Chemicals Co., Ltd., 99%), 1,154.6 g of acrylonitrile (AN, Sigma-Aldrich Co., Ltd., 99%), and 234.2 g of vinyl acetate (VAc, Samchun Chemicals Co., Ltd., 99.5%) was slowly injected into the third solution for 240 minutes to prepare an acrylic polymer emulsion having a core represented by Chemical Formula 6-1 and a shell represented by Chemical Formula 6-2 in a weight ratio of 2:8 between the core and the shell and an average diameter of 211 nm and including solids of 25 wt %.

[Chemical Formula 6-1]

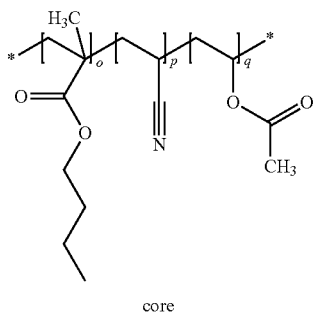

core

Herein, o:p:q=4:3:3, and Tg is 48° C.

[Chemical Formula 6-2]

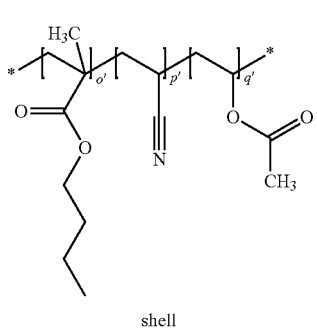

shell

Herein, o':p':q'=1:8:1, and Tg is 88° C.

Example 1: Production of Separator for Rechargeable Lithium Battery (Adhesive Layer)

80.71 wt % of pure (deionized (DI)) water, 19.05 wt % of the emulsion according to Synthesis Example 1, and 0.24 wt % of polyvinyl alcohol (PVA, Daejung Chemicals & Metals Co., Ltd., a molecular weight: 22,000) were mixed to prepare a coating solution. The coating solution was coated to form an 1 μm-thick adhesive layer on the cross-section of a PE fabric panel (a porous substrate with a thickness: 12 μm and air permeability: 120 s/100 cc) in a Bar coating method and then, stored in a 50° C. oven for 1 hour and thus to manufacture a separator for a rechargeable lithium battery cell.

Example 2: Production of Separator for Rechargeable Lithium Battery (Heat-Resistant Layer+Adhesive Layer)

74.50 wt % of pure (deionized (DI)) water, 25.00 wt % of alumina (AES11, Sumitomo Corp.), and 0.50 weight of an acrylic polymer (LM, Hansol Chemical) were mixed to prepare inorganic material dispersion.

85.00 wt % of pure (deionized (DI)) water, 14.58 wt % of the inorganic material dispersion, and 0.13 wt % of polyvinyl alcohol (PVA, Daejung Chemicals & Metals Co., Ltd., a molecular weight: 22,000) were mixed to prepare a coating solution. The coating solution was coated to form a 3 μm-thick heat-resistant layer on the cross-section of the PE fabric panel (a porous substrate with a thickness: 12 μm and air permeability: 120 s/100 cc) in a bar coating method and then, stored in a 70° C. oven for 1 hour and thus manufacture a coated separator.

80.71 wt % of pure (deionized (DI)) water, 19.05 wt % of the emulsion according to Synthesis Example 1, and 0.24 wt % of polyvinyl alcohol (PVA, Daejung Chemicals & Metals Co., Ltd., a molecular weight: 22,000) were mixed to prepare a coating solution. The coating solution was coated to form a 1 μm-thick adhesive layer on the cross-section of the coated separator with the heat-resistant layer in a bar coating method and then, stored in a 50° C. oven for 1 hour and thus manufacture a separator including the adhesive layer and the heat-resistant layer for a rechargeable lithium battery cell.

Comparative Example 1

80.71 wt % of pure (deionized (DI)) water, 19.05 wt % of the emulsion according to Comparative Synthesis Example 1, and 0.24 wt % of polyvinyl alcohol (PVA, Daejung Chemicals & Metals Co., Ltd., a molecular weight: 22,000) were mixed to prepare a coating solution. The coating solution was coated to be 1 μm thick on the cross-section of a PE fabric panel (a porous substrate with a thickness: 12 μm and air permeability: 120 s/100 cc) in a bar coating method and then, stored in a 50° C. oven for 1 hour and thus manufacture a separator for a rechargeable lithium battery cell.

Comparative Example 2

80.71 wt % of pure (deionized (DI)) water, 19.05 wt % of the emulsion according to Comparative Synthesis Example 2, and 0.24 wt % of polyvinyl alcohol (PVA, Daejung Chemicals & Metals Co., Ltd., a molecular weight: 22,000) were mixed to prepare a coating solution. The coating solution was coated to be 1 μm thick on the cross-section of a PE fabric panel (a porous substrate with a thickness: 12 μm and air permeability: 120 s/100 cc) in a bar coating method and then, stored in a 50° C. oven for 1 hour and thus manufacture a separator for a rechargeable lithium battery cell.

Comparative Example 3

80.71 wt % of pure (deionized (DI)) water, 19.05 wt % of the emulsion according to Comparative Synthesis Example 3, and 0.24 wt % of polyvinyl alcohol (PVA, Daejung Chemicals & Metals Co., Ltd., a molecular weight: 22,000) were mixed to prepare a coating solution. The coating solution was coated to be 1 μm thick on the cross-section of a PE fabric panel (a porous substrate with a thickness: 12 μm and air permeability: 120 s/100 cc) in a bar coating method and then, stored in a 50° C. oven for 1 hour and thus manufacture a separator for a rechargeable lithium battery cell.

Comparative Example 4

80.71 wt % of pure (deionized (DI)) water, 19.05 wt % of the emulsion according to Comparative Synthesis Example 4, and 0.24 wt % of polyvinyl alcohol (PVA, Daejung Chemicals & Metals Co., Ltd., a molecular weight: 22,000) were mixed to prepare a coating solution. The coating solution was coated to be 1 μm thick on the cross-section of a PE fabric panel (a porous substrate with a thickness: 12 μm and air permeability: 120 s/100 cc) in a bar coating method and then, stored in a 50° C. oven for 1 hour and thus manufacture a separator for a rechargeable lithium battery cell.

Comparative Example 5

80.71 wt % of pure (deionized (DI)) water, 19.05 wt % of a fluorine-based binder (Solef PVdF, XPH-884, Solvay, solids of 25 wt %), and 0.24 wt % of polyvinyl alcohol (PVA, Daejung Chemicals & Metals Co., Ltd., a molecular weight: 22,000) were mixed to prepare a coating solution. The coating solution was coated to be 1 μm thick on the cross-section of a PE fabric panel (a porous substrate with a thickness: 12 μm and air permeability: 120 s/100 cc) in a bar coating method and then, stored in a 50° C. oven for 1 hour and thus manufacture a separator for a rechargeable lithium battery cell.

Evaluation Example 1: Electrode Adhesion $LiCoO_2$, polyvinylidene fluoride, and carbon black in a weight ratio of 96:2:2 were added to an N-methylpyrrolidone solvent to prepare slurry. The slurry was coated on an aluminum thin film and then, dried and compressed to manufacture a positive electrode.

Graphite, polyvinylidene fluoride, and carbon black in a weight ratio of 98:1:1 were added to an N-methylpyrrolidone solvent to prepare slurry. The slurry was coated on a copper foil and then, dried and compressed to manufacture a negative electrode.

The separators for a rechargeable battery according to Example 1, Example 2 and Comparative Example 1, Comparative Example 2, Comparative Example 3, Comparative Example 4 and Comparative Example 5 were prepared to have a size of 10 cm×10 cm and respectively disposed between positive and negative electrodes having a size of 9 cm×9 cm so that the adhesive layer might face to the negative electrode and then, passed through rolls under a pressure of 150 kgf at 150 mm/sec in an 80° C. chamber to adhere the separators to electrode plates. The separators adhered to the electrodes were cut to have a width of 25 mm and a length of 50 mm to prepare samples. In the samples, the separator was detached 10 mm to 20 mm away from the negative electrode plate, fixed into an upper grip, while the negative electrode plate was fixed into a lower grip with an interval between two grips 20 mm, and then, elongated and peeled off in a direction of 180°. Herein, the peeling speed was 20 mm/min, and a force required to peel 40 mm was three times measured and then, averaged. The measured values were averaged. The results are shown in Table 1.

Evaluation Example 2: Air Permeability

The separators for a rechargeable lithium battery cell according to Examples 1 and 2 and Comparative Examples 1, 2, 3, 4, and 5 were measured with respect to time (seconds) taken until 100 cc of air passes each separator by using an air permeability measuring device (EG01-55-1 MR, Asahi Seiko Co., Ltd.), and the results are shown in Table 1.

TABLE 1

| | Electrode adhesion (N/mm) | Air permeability (sec/(100 cc · 15 μm)) |
|---|---|---|
| Example 1 | 2.5 | 149 |
| Example 2 | 2.3 | 165 |
| Comparative Example 1 | 2.6 | >10,000 |
| Comparative Example 2 | 0.2 | 145 |
| Comparative Example 3 | 2.3 | >10,000 |
| Comparative Example 4 | 0.1 | 143 |
| Comparative Example 5 | 0.9 | 143 |

Referring to Table 1, a separator including a particle-type binder with a core-shell structure according to an example embodiment of the present invention exhibited all improved electrode adhesion and air permeability.

Hereinbefore, the certain exemplary embodiments of the present invention have been described and illustrated, however, it is apparent to a person with ordinary skill in the art that the present invention is not limited to the exemplary embodiment as described, and may be variously modified and transformed without departing from the spirit and scope of the present invention. Accordingly, the modified or transformed exemplary embodiments as such may not be understood separately from the technical ideas and aspects of the present invention, and the modified exemplary embodiments are within the scope of the claims of the present invention.

The invention claimed is:

1. A separator for a rechargeable lithium battery, comprising a porous substrate, and an adhesive layer on the porous substrate, wherein the adhesive layer includes a particle-type binder having a core-shell structure including a core and a shell surrounding the core, the core includes a first polymer having a glass transition temperature of less than or equal to 30° C., the shell includes a second polymer having a glass transition temperature of greater than or equal to 40° C., the particle-type binder has a diameter of 50 nm to 500 nm, wherein the particle-type binder includes one or more (meth)acrylate structural units represented by Chemical Formula 1; at least one selected from among a phenyl group-containing structural unit represented by Chemical Formula 2 and a cyano group-containing structural unit represented by Chemical Formula 3; and an ester group-containing structural unit represented by Chemical Formula 4:

[Chemical Formula 1]

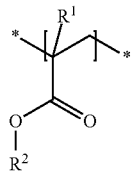

wherein, in Chemical Formula 1,
$R^1$ is hydrogen or a C1 to C5 alkyl group,
$R^2$ is a C1 to C10 alkyl group,
* is a linking point;

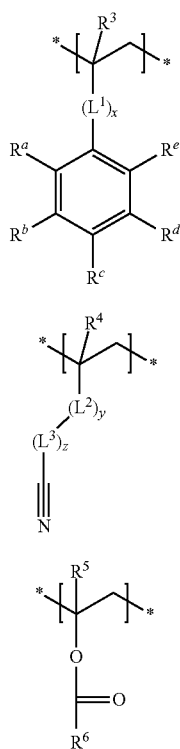

[Chemical Formula 2]

[Chemical Formula 3]

[Chemical Formula 4]

wherein, in Chemical Formula 2 to Chemical Formula 4,
$R^3$ to $R^5$ are independently hydrogen or a C1 to C5 alkyl group,
$R^6$ is a C1 to C10 alkyl group,
$R^a$ to $R^e$ are independently hydrogen or a C1 to C5 alkyl group,
$L^1$ to $L^3$ are independently a C1 to C5 alkyl group,
x, y, and z are independently an integer of 0 to 2, and
* is a linking point, and
wherein the first polymer includes 0 to 0.2 mole of the phenyl group-containing structural unit represented by Chemical Formula 2 or the cyano group-containing structural unit represented by Chemical Formula 3 and 0.5 mole to 0.8 mole of the ester group-containing structural unit represented by Chemical Formula 4 based on 1 mole of the (meth)acrylate structural unit represented by Chemical Formula 1.

2. The separator for a rechargeable lithium battery of claim 1, wherein the particle-type binder includes a polyacrylic binder or a polyolefin-based binder.

3. The separator for a rechargeable lithium battery of claim 1, wherein the particle-type binder includes two or more types of the (meth)acrylate structural units that are represented by Chemical Formula 1 and different from each other.

4. The separator for a rechargeable lithium battery of claim 1, wherein
the first polymer includes 40 wt % to 100 wt % of the one or more (meth)acrylate structural units based on a total mass of the first polymer, and
the second polymer includes 0 wt % to 77 wt % of the one or more (meth)acrylate structural units based on a total mass of the second polymer.

5. The separator for a rechargeable lithium battery of claim 1, wherein
the second polymer includes 0.5 mole to 5.0 mole of the phenyl group-containing structural unit represented by Chemical Formula 2 or the cyano group-containing structural unit represented by Chemical Formula 3 and 0.5 mole to 1.2 mole of the ester group-containing structural unit represented by Chemical Formula 4 based on 1 mole of the (meth)acrylate structural unit represented by Chemical Formula 1.

6. A separator for a rechargeable lithium battery, comprising
a porous substrate, and
an adhesive layer on the porous substrate,
wherein the adhesive layer includes a particle-type binder having a core-shell structure including a core and a shell surrounding the core,
the core includes a first polymer having a glass transition temperature of less than or equal to 30° C.,
the shell includes a second polymer having a glass transition temperature of greater than or equal to 40° C.,
the particle-type binder has a diameter of 50 nm to 500 nm, and
wherein the particle-type binder includes one or more (meth)acrylate structural units represented by Chemical Formula 1; at least one selected from among a phenyl group-containing structural unit represented by Chemical Formula 2 and a cyano group-containing structural unit represented by Chemical Formula 3; and an ester group-containing structural unit represented by Chemical Formula 4:

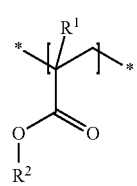

[Chemical Formula 1]

wherein, in Chemical Formula 1,
$R^1$ is hydrogen or a C1 to C5 alkyl group,
$R^2$ is a C1 to C10 alkyl group,
* is a linking point;

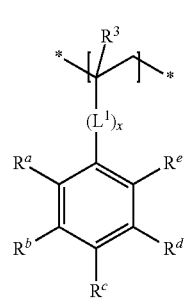

[Chemical Formula 2]

[Chemical Formula 3]

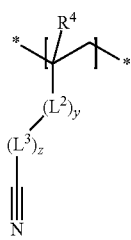

[Chemical Formula 4]

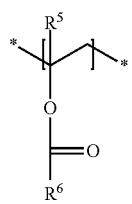

wherein, in Chemical Formula 2 to Chemical Formula 4, $R^3$ to $R^5$ are independently hydrogen or a C1 to C5 alkyl group, $R^6$ is a C1 to C10 alkyl group, $R^a$ to $R^e$ are independently hydrogen or a C1 to C5 alkyl group, $L^1$ to $L^3$ are independently a C1 to C5 alkyl group, x, y, and z are independently an integer of 0 to 2, and

* is a linking point, wherein at least one selected from among the first polymer and the second polymer includes a structural unit represented by Chemical Formula 5 or Chemical Formula 6:

[Chemical Formula 5]

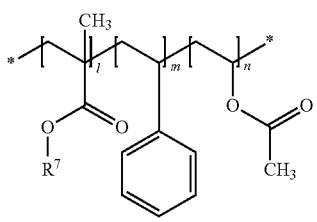

[Chemical Formula 6]

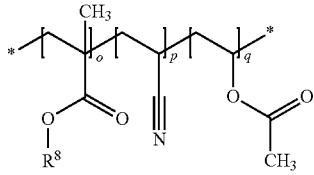

wherein, in Chemical Formula 5 and In Chemical Formula 6, $R^7$ and $R^8$ are independently a C1 to C5 alkyl group, l and o of the first polymer are each independently 50 mol % to 60 mol %, m and p are each independently 0 mol % to 10 mol %, and n and q are each independently 30 mol % to 50 mol %, l and o of the second polymer are each independently 10 mol % to 30 mol %, m and p are each independently 50 mol % to 70 mol %, and n and q are each independently 10 mol % to 30 mol %, and

* is a linking point.

7. The separator for a rechargeable lithium battery of claim 6, wherein the first polymer and the second polymer include structural units represented by the same chemical formula, and l, m, and n of the first polymer and the second polymer or o, p, and q of the first polymer and the second polymer are different from each other.

8. The separator for a rechargeable lithium battery of claim 1, wherein the core and the shell are included in a weight ratio of 1:9 to 3:7 based on a total weight of the particle-type binder.

9. The separator for a rechargeable lithium battery of claim 1, wherein a difference between the glass transition temperature of the core and the glass transition temperature of the shell is greater than or equal to 20° C.

10. The separator for a rechargeable lithium battery of claim 1, wherein the adhesive layer further includes an adhesive binder.

11. The separator for a rechargeable lithium battery of claim 1, which further includes a heat-resistant layer between the porous substrate and the adhesive layer.

12. The separator for a rechargeable lithium battery of claim 11, wherein the heat-resistant layer further includes heat-resistant binder.

13. A rechargeable lithium battery, comprising a positive electrode,
a negative electrode, and
the separator for the rechargeable lithium battery according to claim 1 disposed between the positive electrode and the negative electrode.

* * * * *